Oct. 27, 1953  G. FRIEDMANN  2,656,648
MEANS FOR TRANSPORTING AND DISTRIBUTING
FERTILIZERS ON FIELDS
Filed Feb. 16, 1948 3 Sheets-Sheet 1
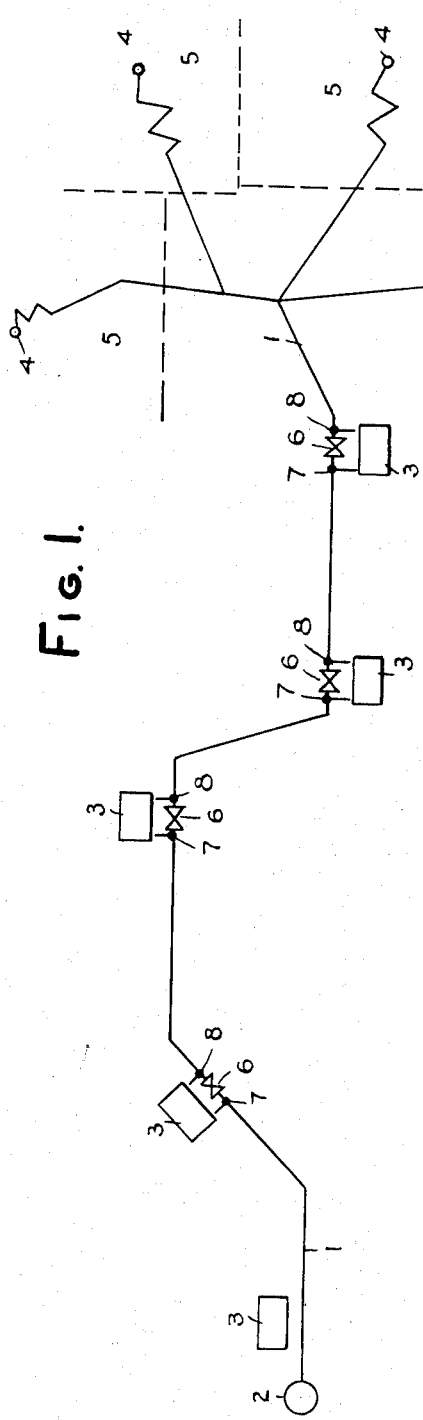
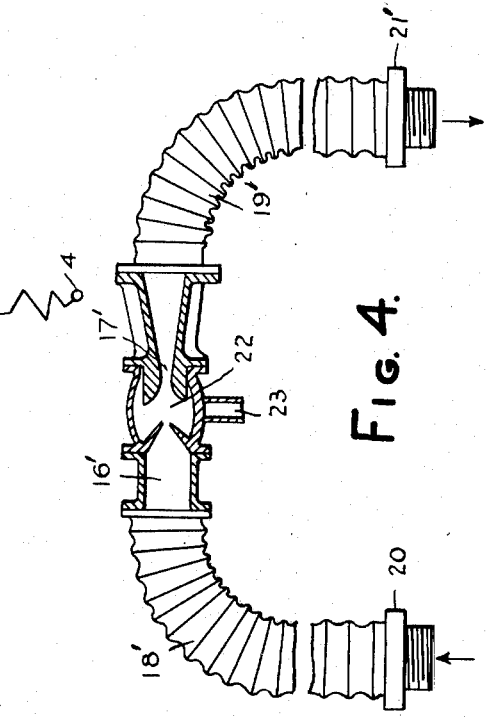
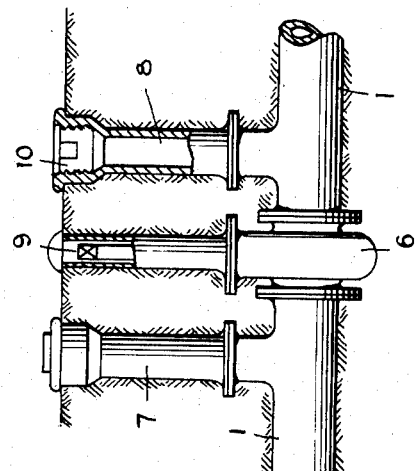
INVENTOR
GIOVANNI FRIEDMANN
BY
A. B. Foster
ATTORNEY

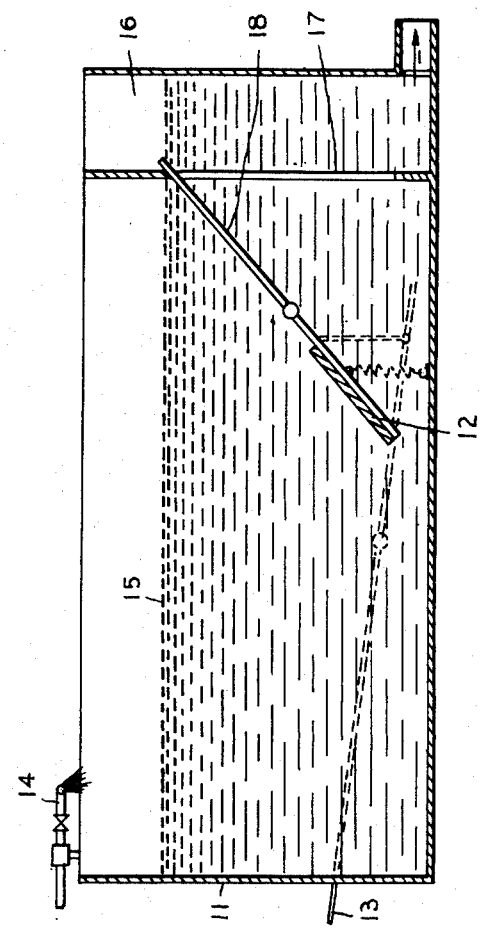

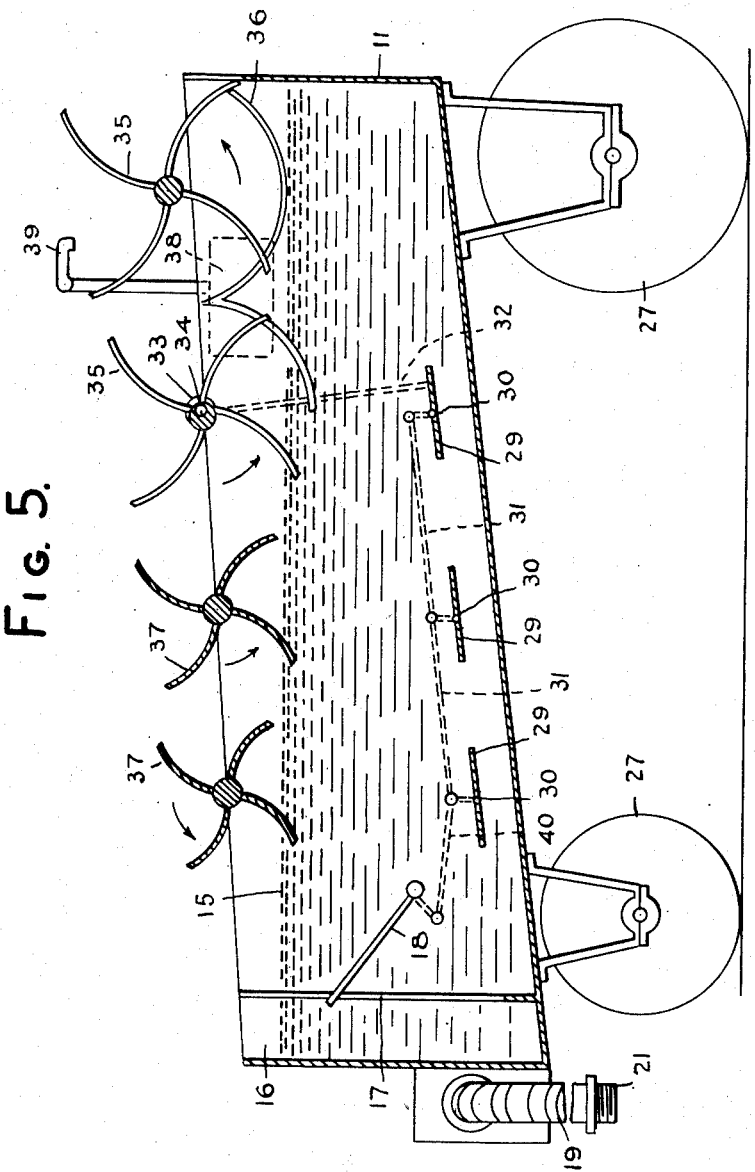

Patented Oct. 27, 1953

2,656,648

UNITED STATES PATENT OFFICE 2,656,648

MEANS FOR TRANSPORTING AND DISTRIBUTING FERTILIZERS ON FIELDS

Giovanni Friedmann, Milan, Italy

Application February 16, 1948, Serial No. 8,718
In Italy January 28, 1942

Section 1, Public Law 690, August 8, 1946
Patent expires January 28, 1962

3 Claims. (Cl. 47—1)

The object of the present invention is to provide a plant by means of which it is possible to transport the fertilizing substances contained in stable manure (or as commonly termed, dung) located where the dung storage is most convenient and to distribute said substances on fields located at any relative position and at any distance with respect to anyone of said dung supplies.

Another object is to provide such a plant with a less expense than would be necessary for providing a whole plant for each of said dung supplies.

A further object is to employ improved devices in making such a plant and to protect them when they are not actually in use.

Still another object is to employ a single water main for the irrigation of said fields and for the transportation of water carrying stable manure and other fertilizer, starting from anyone of several different supplies of manure, so as to make it possible to utilize the same main for transporting and distributing at the same time chemical manures (chemical fertilizers) or correcting agents derived from a single manufacture or store.

The invention will be hereinafter described according to some embodiments by way of example with reference to the attached drawings wherein:

Fig. 1 is a diagrammatic plan view of a plant,

Fig. 2 represents the detail of the two hydrants,

Fig. 3 represents a tank for wetting, agitating and suspending the stable manure in water, Fig. 4 is a diagrammatic representation of an injector, Fig. 5 shows a car with tank for mixing the manure with water.

The plant according to the diagram of Fig. 1 consists of a piping 1 laid down on the ground, or underground, starting from a water source 2, such as an elevated tank or a pump, passing near several dung storage piles 3 and leading to transportable spray devices 4 in several fields 5 at any distance from the stores 3, and at any level even above the latter. Near each dung storage pile, the piping 1 is provided with an arrangement as shown on a larger scale in Fig. 2, which comprises a gate 6 and two branches the one 7 upstream and the other 8 downstream of said gate; if the main 1 is underground, said branch-pipes reach the ground level, and the actuating member 9 of the gate is also prolonged upwards to near to the ground level. Of course other suitable closing valves may be provided in the pipes 7 and 8, and are not shown in the drawing for sake of simplicity, only a removable plug 10 being represented. The pipes 7 and 8 as shown with removable closing means 10 at their tops, are herein referred to as "hydrants." By removing said closures 10, aqueous liquid from 7 may pass through an injector such as that shown in Fig. 4, and thence into the pipe 8, the suction chamber 22 of the injector drawing in liquid suspension of stable manure from 15 of Fig. 3 or 5. The mixed liquid can then be used for irrigating and fertilizing the soil.

The plant according to the invention comprises, further, means for soaking and mashing up the dung in water, so as to obtain a liquor therefrom; such means may have the form diagrammatically shown in Fig. 3, that is to say they are composed of a tank 11 in which is a beating device 12 which can be operated by a man's foot applied on lever 13 and operates to break up or suspend the dung in water fed by pipe 14, so as to obtain a liquor 15, which passes into the compartment 16 through a grid 17 kept clean by a comb or series of slats 18 moving integrally with the beating plate or agitator 12.

The liquor 15 is fed into the main 1 by means of an injector which may be that shown, by way of example only, in the diagrammatic representation of Fig. 4.

Inlet and outlet pipes 18' and 19', of this injector have connections 20' and 21', for connecting to the upper ends of the pipes or hydrants 7 and 8 respectively, while the gate or valve 6, between these, is closed or partly closed. The suction chamber 22 of the injector may be connected to a suction pipe 23, for carrying the suspension of stable manure, 15, from the tank of Fig. 3 or Fig. 5, into the space 22, from which it flows, mixed with the water from pipe 19', into the hydrant 8.

According to an improved embodiment of the invention, the whole apparatus for preparing the dung liquor and introducing it into the main 1 may be rendered transportable so as to further reduce the cost of the whole plant, only one soaking and liquefying device being sufficient for several farms.

A diagrammatic representation of such embodiment is shown in Fig. 5, in which the tank 11 is mounted on wheels 27 so as to constitute a car, bearing also an injector of the type described above, with inlet and outlet flexible tubes (only one of them is shown in 19 with a connection 21) to be connected with the hydrants 7 and 8 of the main.

The beating means in the embodiment of Fig. 5 consist of plates 29 oscillating on axles 30 and actuated by links 31 and 32, the latter being actuated by an eccentric 33 mounted on the shaft 34 of one of the rotating combs or rack wheels 35. The latter have the functions of conveying the straw to the tops of the cylindric grids 36 and discharging it out of the tank. Said rack wheels 35 are operatively connected with the paddle wheels 37 cooperating for the beating action and all of said wheels are driven by an hydraulic motor diagrammatically indicated in 38 fed by the water from the main 1, the discharge water of said motor being fed through the pipe 39 into the tank 11 to soak the dung and form the liquor to be introduced into the injector.

This liquor passes in the compartment 16 through the grid 17 kept clean by the oscillating comb 18 actuated by the link 40 connected with the links 31.

Having now particularly described and ascertained the nature of my said invention and in what manner the same is to be performed, I claim:

1. A transportable device for introducing animal fertilizing material into a piping which piping is provided with a couple of hydrants with a valve between said hydrants, such device including a tank, agitating means in said tank capable of well mixing stable manure with water, an injector the suction pipe of which communicates with the interior of said tank and tubes for connecting the feeding end and the delivery end of the injector with said hydrants.

2. A transportable device as claimed in claim 1 and having a raking device supported partly below and partly above the normal liquid level in said tank, and means for operating said raking device whereby straw contained in said stable manure is removed from the liquor contained in said tank.

3. A transportable device for introducing animal fertilizer material into a piping which piping is provided with a couple of hydrants with a valve between them, such device including a tank, a grid therein subdividing said tank into a major section and a minor section, agitating means in said major section capable of well mixing stable manure with water, an injector the suction pipe of which communicates with the interior of said tank and tubes for connecting the feed end and the delivery end of said injector with said hydrants, such tank also carrying a raking device movably supported adjacent said grid and having teeth penetrating between the bars of said grid, and a gearing driven in conjunction with said agitating means for operating said raking device for cleaning said grid.

GIOVANNI FRIEDMANN.

References Cited in the file of this patent

UNITED STATES PATENTS

| Number | Name | Date |
|---|---|---|
| 1,042,501 | Thompson | Oct. 29, 1912 |
| 1,247,166 | Steelquist | Nov. 20, 1917 |
| 1,281,427 | Steelquist | Oct. 15, 1918 |
| 1,893,707 | Karshner | Jan. 10, 1933 |
| 1,991,851 | Hammell | Feb. 19, 1935 |

FOREIGN PATENTS

| Number | Country | Date |
|---|---|---|
| 882,910 | France | Mar. 8, 1943 |
| 9,112 | Great Britain | of 1887 |
| 251,221 | Great Britain | Apr. 29, 1926 |
| 259,402 | Great Britain | Oct. 14, 1926 |
| 259,403 | Great Britain | Oct. 14, 1926 |
| 395,661 | Italy | June 11, 1942 |
| 206,637 | Switzerland | Nov. 16, 1939 |

OTHER REFERENCES

Ser. No. 251,858, Friedmann (A. P. C.), published April 27, 1943.